(12) United States Patent
Perozziello

(10) Patent No.: US 11,745,275 B2
(45) Date of Patent: Sep. 5, 2023

(54) METHOD AND APPARATUS FOR KEY ORIGINATION

(71) Applicant: Eric Anthony Perozziello, Discovery Bay, CA (US)

(72) Inventor: Eric Anthony Perozziello, Discovery Bay, CA (US)

(*) Notice: Subject to any disclaimer, the term of this patent is extended or adjusted under 35 U.S.C. 154(b) by 44 days.

(21) Appl. No.: 17/543,163

(22) Filed: Dec. 6, 2021

(65) Prior Publication Data
US 2022/0371107 A1 Nov. 24, 2022

Related U.S. Application Data

(62) Division of application No. 16/673,610, filed on Nov. 4, 2019, now abandoned.

(51) Int. Cl.
*B23C 3/35* (2006.01)
(52) U.S. Cl.
CPC .......... *B23C 3/355* (2013.01); *B23C 2235/12* (2013.01); *B23C 2235/21* (2013.01); *B23C 2235/44* (2013.01)

(58) Field of Classification Search
CPC ....... B23C 3/355; B23C 3/35; B23C 2235/12; B23C 2235/44; B23C 2235/48; B23C 2235/21; B23C 2235/00
See application file for complete search history.

(56) References Cited

U.S. PATENT DOCUMENTS

| | | |
|---|---|---|
| 1,254,442 A | 1/1918 | Smith |
| 1,750,218 A | 3/1930 | Falk |
| 1,889,461 A | 11/1932 | Hansen |
| 1,895,849 A | 1/1933 | Haubroe |
| 2,757,578 A | 8/1956 | Saucedo |
| 3,118,346 A | 1/1964 | Simon |
| 3,440,906 A | 4/1969 | Allen |
| 3,884,121 A | 5/1975 | Agius |
| 4,132,151 A * | 1/1979 | Weber .................... B23C 3/355 409/86 |
| 4,256,423 A | 3/1981 | Juskevic |
| 4,373,414 A | 2/1983 | Agius |
| 4,521,142 A | 6/1985 | Juskevic |
| 4,646,590 A | 3/1987 | Jones |
| 4,898,504 A | 2/1990 | Agius |
| 5,271,698 A | 12/1993 | Heredia |
| 7,070,369 B2 | 7/2006 | Jalove |
| 9,475,130 B2 | 10/2016 | Parillo |

* cited by examiner

*Primary Examiner* — Alan Snyder

(57) ABSTRACT

A retainer, that holds a group of precision, off-the-shelf components in relative alignment so as to allow a standard key duplicating machine to function as a key code origination machine is disclosed. A person of ordinary skill in pinning a lock and operating a key duplicating machine is able to practice the invention. An aspect of the invention is that an ordinary, inexpensive key duplicating machine can be converted to code-cutting functionality with minimal cost, requiring no adaptation of key duplicating machine. Also disclosed are methods of positional registration, machine error compensation, and notch shaping.

9 Claims, 10 Drawing Sheets

METHOD AND APPARATUS FOR KEY ORIGINATION

FIELD OF THE INVENTION

The field of the present invention relates generally to key origination. In particular, the field of the invention relates to adaptation of a key duplicating machine to generate original keys from a code.

BACKGROUND

In order to program or reprogram a lock to be operated by a particular key, that key must be originated by code when no such key exists. A key may need to be generated when the code is known but the key is unavailable or lost. This process is known as key generation, key origination, or code-cutting a key and is generally performed on a machine known as a code cutting machine.

If an original key is available, a copy can be produced by duplication, wherein the profile of an original key is traced while simultaneously cutting the duplicate key on a machine known as a key duplicating machine or duplicator.

Key duplicating machines and code cutting machines are generally separate machines. Key duplicating machines are ubiquitous, found in nearly every hardware store, every locksmith's shop and mobile van, and often with apartment managers, institutional maintenance shops, and landlords. Code cutting machines have a more limited distribution, which may be due to cost and the skill needed to operate them.

Some hybrid or combination machines have been sold. These machines may offer no cost savings, as the purchase price is often greater than the cost of buying both functionalities in separate machines. The advantage is often in the space savings in a cramped environment such as a locksmith's van.

Keys

Most standard keys are themselves essentially 2-dimensional precision mechanical codes, which, when entered into a lock, cause the lock to actuate (open) if the key's code is allowed. The key code is typically defined by depths and spaces. A series of cuts, spaced along the longitudinal or space axis, are made to specific varying depths in the transverse or depth axis. Manufacturers of locks use different systems having specific, usually uniform, spacing in the longitudinal axis and discrete depth settings in the transverse axis. These systems are codified in large volumes known as Depth and Space manuals.

A key conveys precise coded information in mechanical form, and therefore must have mechanical registration, or a zero-reference, in both axes in relation to the lock it operates. Registration is also needed between a machine and a key when copying or generating the key. There are many different schemes for mechanical registration.

In the longitudinal (space) axis, the most common registration feature is the shoulder of a key—a stop that limits the insertion of the key into the lock. Another method references the tip or a step near the tip of the key being used to limit insertion.

In the transverse (depth) axis, the most common reference is the bottom of the key. Another method is a groove or step in the side milling (wards) of the key. The later is commonly used in double sided, or double-bitted locks/keys.

The degree of precision of the key, and lock it fits, determines the quality of the security provided. Tight tolerances in the lock and key allow a larger code-space (more unique variations of distinct locks/keys) and provide a lock that is more resistant to manipulation by methods other than use of a permitted key. It is the general practice that most lock/key systems have greater precision in the transverse (depth) axis (the pin stack and cut depth on the key) than in the longitudinal (space) axis. Factory precision in the depth can be as tight as 12 micron (0.0005 inch) to 25 micron (0.001 inch), which requires pins of similar tolerance, and keys also of this tolerance, though tolerance may be less or greater depending on application and cost. To accommodate wear of both lock pins and key, the lock is often designed to accept looser tolerances, and still operate (for example, by using chamfered pins). In the space dimension, typically 125 micron (0.005 inch) is accepted, often increased by forming wider flat regions of the depth cut to allow longitudinal misalignment while still raising pins to the correct height for the lock. Wider flat regions of the cut or notch are conventionally formed in a code-cutting machine by using a cutter having a corresponding wider flat region between angled or beveled sides that form ramps between adjacent cuts.

Key Duplicating Machines

Common key duplicating machines have a rotary milling cutter, rotary file or rotary abrasive cutter, and a tracer or stylus, with the position of both remaining fixed relative to the machine frame during the duplication operation. A carriage, having two vises moving in unison, is able to move both in the longitudinal and transverse directions relative to the fixed tracer and cutter. The master vise holds the original key that is to be duplicated by tracing, while the slave, or copy vise is loaded with a key blank, which will be cut to form a copy of the original. The tracer communicates with the original key used as a template, guiding the carriage and therefore the key blank into the cutter, forming a faithful facsimile of the original.

Motion is relative, and other arrangements are known in the art. For example, a master key and blank may be held stationary, while a tracer or stylus is moved in unison with a cutter, yielding the same result.

Registration or Alignment

The key blank will have a two-dimensional profile similar to the original, but in order for the profile to be registered to the corresponding reference features as the original, both keys need to be positioned properly before tracing and cutting. There are several methods for accomplishing this.

In the longitudinal direction, a key gauge may be used to measure the distance between the shoulders (or tips) of the original key and the blank (copy) key. The key gauge is designed to match the distance between the stationary tracer and cutter.

One method for registering keys in the transverse direction stipulates that the bottom of both keys be in contact with a landing in their respective vise. Another method uses a matching longitudinal groove in each key that mates with a ridge in the jaw or vise of each respective vise.

Registration or alignment of the keys is between the original (master) key and the key blank (copy). This may be accomplished by transitive registration, for instance, by registering a key to a vise, which has been pre-arranged or calibrated to be in registration with a gauge or feature. In a common example, the longitudinal distance between matching features on the keys, when properly registered or aligned, will match the corresponding distance between the tracer or stylus and the cutter. In the transverse (depth) direction, the bottoms of the keys are either in the same plane, or have an offset that is the same as the transverse offset between the tracer and the cutter.

Tuning of the Key Machine

The key duplicating machine may be tuned such that the tracer is adjusted to match an offset between a landing, or groove of the master vise and copy vise in the transverse direction. A separate gauge may be calibrated to match the cutter-to-tracer longitudinal separation. While this method used by some manufactures involves registration of keys to intermediate reference objects or features within the vises, the ultimate goal is the registration of the key blank to the master key for that particular machine's configuration.

Tuning of the key machine usually involves minor adjustment of the normally-fixed tracer tip in the transverse direction so that copied depths match. Once the machine is properly tuned, the only registration needed is the master key to the copy key (blank) in both directions. However, most key duplicating machines are only adjustable for a single depth by motion of the tracer. So, for instance, if the master and copy vises are not parallel with each other, a single depth adjustment cannot tune all of the depths along the key to be correctly duplicated.

After cutting a test key, the resultant key is tested in the lock and measured. If it is not faithful to the original, the machine is adjusted or tuned, typically by changing the position of the tracer, or adjusting the key gauge. Variations on the operation and adjustment exist for different machines, but this description captures many of the models encountered.

Key Duplicating machines have been in existence for more than a century, but the principles of operation are relatively unchanged. An early example of such a machine is seen in U.S. Pat. No. 943,806. A much more modern key duplicating machine is embodied in U.S. Pat. No. 5,259,708, which can operate in an automatic mode or a manual mode.

Locks and Pins

There exist many types of locks, including disc, wafer and pin tumbler, etc. For non-high security applications, the corresponding keys are similar, generally described by depth and space information. High security keys add additional features, for instance v-shaped cuts angled about the transverse axis which cause mating v-shaped pins to rotate, or precision features on the side of the key which must mate with sidebars in the lock. A third or additional spatial dimension is thereby added to the key code.

Pin tumbler locks are very common, and use precision pins of varying length to create a code in the lock that matches with the code in one or more keys. High precision pins are commonly manufactured on a high precision Swiss Screw Machine. A long bottom pin (or stack of pins) in a lock requires a deep cut in the key that operates it. Conversely, a short pin coincides with a shallow cut in the key. Pins are manufactured in the quantities of billions of units in varying lengths, inexpensively, yet very precisely. Pins can vary in shape, for instance with added chamfer or taper, but the most important precision dimension is the overall length. These pins can be changed quickly, at little cost and using ordinary skill in order to reprogram the lock for use with different key(s).

A common nominal plug diameter used in residential and commercial locks is 0.5 inch (12.7 mm) and therefore is used here for the sample calculation. In such a system, for each bitting cut or notch on the key, the root depth describes the distance from the bottom surface of the key to the top of the notch. Upon insertion into a lock, a lock pin is pushed down into the notch while the bottom of the key contacts the bottom of the plug hole. If the key root depth plus the pin length adds to 0.5 inch (12.7 mm), then this pin location is said to be "at the shearline". If all pin locations satisfy this same condition (root depth on the key at a location plus lower pin length in the lock at the matching location adds to 0.5 inch) then all pins are at the shearline and the lock plug with key are able to rotate and open the lock. The foregoing description is simplified, and ignores, for example, master-keyed systems, which may include stacks of pins, but the concept is similar.

Discussion of the Prior Art

There are numerous methods for code-cutting keys, spanning nearly a century of development.

First, and most commonly in use today, is a code-cutting machine that creates a profile on a key from numerical data. An early example of this is embodied in U.S. Pat. No. 1,750,218, wherein two pre-drilled indexing discs (one for transverse axis and one for the longitudinal axis) precisely guide a key blank into engagement with a cutter using a straight in-and-out motion, each drill hole corresponding to a numerical value of a key code. The longitudinal axial motion is driven by a rack and pinion, while the transverse depth motion is facilitated by an Archimedes spiral cam. U.S. Pat. No. 1,889,461 discloses a similar operation using linear gauges rather than discs. The principle disadvantages of this class of machine are high cost, and a large amount of space taken for this specialized hardware in an often already-cramped shop or van. Also, to change keying systems (for example, to a different manufacturer of lock), the machine must be set up with different discs. U.S. Pat. No. 3,884,121 uses a threaded precision indexing device (precision micrometer screw with indexed rotation) to precisely move a cutter in and out in the transverse (depth) direction and a similar mechanism for longitudinal (space) axis positioning. This improvement requires little or no conversion to change lock systems, however, because of a more analog motion, requires more operator attention to precisely index to the proper location before ceasing motion. Moving slightly past the intended index results in a miscut key. U.S. Pat. No. 4,373,414 uses a set of interchangeable cams corresponding to each manufacturer's depth and space specifications along with a punch or shear instead of a rotary cutter for key material removal.

Attempts have been made to combine a duplicator and code-cutter in one machine, for example, U.S. Pat. No. 7,070,369 at the expense of even higher cost. Fully electronic control machines are also made, which can trace an arbitrary profile (fully Computer Numeric Control, or CNC), but these machines are many times higher in cost than manual counterparts.

Second are methods that attempt to cut a key using the actual lock cylinder and its pins (or a reasonable facsimile thereof). An early example of this is embodied in U.S. Pat. No. 1,254,442. This invention extends an early technique of making a key for a lock, whereby a locksmith inserts a keyblank into the removed lock cylinder and observes the protrusion of pins from the top of the cylinder. He then iteratively files the key in multiple locations until the pins for that lock cylinder lie flush with the top of the cylinder when the key is present. But instead of iterative filing, U.S. Pat. No. 1,254,442 effectively gauges the protrusion of each pin when a blank is inserted, and cuts a separate but identical blank by an amount equal to the protrusion. This requires the registration of the cutter to the top of the blank to be cut, simultaneous with the registration of a lever on top of the protruding pin. Then, moving in unison, the carriage including the cutter and the lever descends an amount equal to the pin protrusion, halted by the top of the cylinder, making a cut in the blank equal to the pin protrusion. It is important to note that each pin in the lock cylinder is the actual pin that will be used to program the lock, and therefore a longer pin results in a deeper cut because the pin's protrusion is effectively gauging the key deeper into cutter. Practicing this invention requires a special, purpose-built machine, and extreme care to simultaneously register the lever and cutter at each cut.

U.S. Pat. No. 1,895,849 operates similarly, measuring a protrusion of the actual lock programming pins from a cylinder, with a different mechanical arrangement. This too, requires a purpose-built machine, and uses the actual lock pins and a blank to produce protrusions of the pins from the cylinder as a depth gauge.

U.S. Pat. No. 2,757,578 arranges the lock pins in a cylinder, but without a key blank present, and therefore, the pins are recessed into the pinholes in the plug. A gauge pin on the machine plunges into each pinhole to establish a downward limit of travel for the cutter for each cut. Using the actual lock programming pins, the smaller the pin, the smaller the cut on the key. The key stock is raised or lowered in proportion to the size of the pin. This also is a purpose-built code machine using the actual lock programming pins to create the code in a working key by making an effective mechanical measurement of those pins. A problem with this method is that lock cylinders are not designed with the bottom of pinholes at a precise depth. Holes in the lock cylinder need only be manufactured sufficiently deep enough that (upper) driver pins enter the cylinder when the key is removed. The pin may then rest on keyway broaching (wards), or the bottom of the drilled hole, but in any case, this reference is not typically designed, and need not be, precise enough to practice this method with success. An adjustment is provided to allow for different manufacturers drilling pinholes to different depths, but this does not compensate for the lack of tolerance in that operation. Furthermore, the cutter must be disengaged while the gauge pin is seated in another opening, before the cutter is again brought into engagement with the keystock (blank), otherwise, cutter would unintentionally cut the key blank when transitioning to adjacent cuts.

U.S. Pat. No. 3,118,346 discloses another purpose-built machine wherein registration is first preformed by adjusting cutter to touch the top of a keyblank while a indexing pin just touches the top of a cylinder. Protrusion of the pins from the cylinder are used such that rotation of a lever will move the blank into the cutter by the amount of protrusion.

U.S. Pat. No. 3,440,906 attempts to perform code cutting and duplication in the same machine. Operation consists of loading a lock cylinder along with a key blank and the pins used to program the lock, and then rotating the pin carriage and the key bearing carriage and moving a key into the cutter wheel by the same increment which defines the extension of the tumbler beyond the lock cylinder surface. This purpose-built machine also adds a feature of a micrometer to facilitate horizontal motion of the cutter while at depth to widen the cut without changing the cutter.

It will be appreciated that in many of the aforementioned prior art references which use the actual lock programming pins for depth gauging cannot easily be adapted for use in the vises of a standard key duplicating machine. A longer lock programming pin installed in a master vise, communicating with a tracer causes a cutter to be moved less deep into a key blank, compared to a shorter pin, which would cause the cutter to be permitted deeper into the key blank. This is opposite of what would be needed to produce a key for operation in the same lock from which the programming pins were obtained. An additional limitation of this prior art is that it operates with a pin tumbler cylinder and pins, but is not designed to originate keys from other types of locks.

U.S. Pat. Nos. 4,256,423 and 4,521,142 use a series of rotating discs with selectable notch depths so as to simulate the profile of a key. This machine is purpose-built, and claims that an aspect is that it can also function as a duplicator/tracer.

U.S. Pat. No. 5,271,698 attempts to create a simulated bit notch pattern from a set of star wheels. An aspect also aims to be able to convert a conventional duplicating machine to a code cutter, but this aspect is only symbolically illustrated in the disclosure. Adaptation of the code cutting cassette to a duplicator could be complex, partly fabricating a new machine. The cassette requires numerous custom hardware components, most of them being of high precision. Additionally, the notch elevation selector wheels have a finite number of selectable elevation notch segments, with four to seven illustrated. Additional notch segments would inhibit key follower tracing.

U.S. Pat. No. 5,271,698 teaches that an important benefit of the simulated bit notch pattern created by the selector wheels may produce a shape on the generated key that lacks a pointed interface between adjacent notch segments present on factory cut keys and that the pointed interface is an undesirable aspect of factory cut keys. To the contrary, the pointed interface is intentional and desirable to mitigate shoulder wear between notches. This is evident considering that modern CNC code machines, capable of producing substantially arbitrary bit notch shapes and interfaces between them, retain the pointed interface. The pointed interfaces are also used by some high security keys to impart a necessary rotation to the lock pins.

There are additional methods that fall outside of the two general methods above. One such method is the use of well-known "depth and space keys". In this method, a standard key duplicating machine is employed, along with a set of about 10 pre-fabricated depth and space keys for a particular manufacturer of lock, each key having only one unique depth formed in all of the spaces. This requires a depth key be loaded into the master vise and registered, once for each unique depth desired on the resultant key, and traced very carefully, cutting only the spaces for that depth in each operation. This requires extreme skill and care so as to not violate an adjacent space while cutting the eminent space. For each space on the resultant key, a new depth key is loaded, and a cut is performed.

A recent attempt to mechanize the depth and space key process employs a revolving magazine of such keys affixed to a modified duplicating machine, embodied in U.S. Pat. No. 9,475,130. Such a mechanism requires much tuning to ensure that all keys in the magazine are registered in at least two spatial dimensions to the machine and to the key blank. Just as with depth and space keys, skill and care are needed to produce a key without error.

U.S. Pat. No. 4,898,504 uses a single space key, having notches at predetermined spacing for a particular lock manufacturer, and further has a rotating disc with detents or indices for predetermined depths. Similar skill and care is needed in creating a key from this space-key system.

Accordingly, what is needed is a simple system that can adapt a key duplicating machine to the function of producing a key by numerical code, which requires no modification to the duplicating machine, and requires skill commensurate with the skills already possessed by those in the art. Such a system should only require a person with the skill to operate a key duplicator, perform normal maintenance operations such as replacing the cutter and tracer therein, and the skills required in the normal operations of repining or reprogramming a lock. The system should also primarily make use of precision components, which are inexpensive, off-the-shelf and readily available or already in stock by the person.

SUMMARY

In order to overcome the above-discussed disadvantages of conventional code cutting methods, one aspect of the present invention enables code cutting functionality in a key duplicating machine without modification to the machine. In one embodiment, a suitable cutter, and suitable stylus or tracer are optionally selected. Pins or other suitable precision elements are selected from a calculation based on the desired code for the key, then installed into the retainer, and the resultant assembly is installed into the master vise of the key duplicating machine. A key blank is conventionally installed into a slave vise and the assembly and the key blank are registered in two dimensions with one another, or to the machine using conventional procedures similar to those known in the art. The profile formed by the assembly is traced in a conventional manner, resulting in a code-cut key.

An aspect of the present invention cuts keys from a numerical code. The limits of travel are defined mechanically, the components defining said limits being calculated from the numerical code. Conventional pins used in pin-tumbler locks may be employed as precision mechanical components defining depths of cuts, but generally speaking, the pins are not the same pins that are used to program the lock. Perhaps counter-intuitively and in contrast to some prior art, a longer pin will result in a shallower cut, whereas a shorter pin will result in a deeper cut, as will be shown. This produces advantages in the adaptation of the system to a standard key duplicating machine, such that it may be mounted in the master vise similar to the way an original or master key would be mounted.

An aspect of the present invention employs a retainer to hold precision components in relative alignment so that they may be suitably traced by a key duplicating machine to produce an original key when none is presently available. The retainer generally need only be of normal precision readily attainable by many low cost manufacturing methods, relying on the readily-available, off-the-shelf higher precision components for the precision where needed. Retainer is formed in a size and shape that lends itself to mounting in a jaw, holder, vise or clamp of a key duplicating machine in lieu of an original or master key.

Precision components are available in many off-the-shelf forms. The most commonly available form being the pins that a locksmith likely already possesses to program or re-pin a pin-tumbler style lock. Other precision components can include precision ground flat, cold drawn or rolled flat stock, gauge stock, or drill rod. The retainer is designed to hold a combination of these components into alignment useful for tracing a key profile. Magnets may be employed to hold components in place or to assist in assembly when ferromagnetic materials are used. It will be appreciated that while pins of a pin-tumbler variety may be used as precision components, a key for any type of lock system may be produced from this method. For instance, wafer tumbler or disc tumbler keys can be similarly originated. Slotted or Lever lock keys are also compatible, provided that a suitable cutter and suitable tracer are selected for the application. Pins are merely re-purposed as readily available precise gauges for the purpose of establishing precise mechanical limits.

The retainer is manufactured by CNC machining, 3D printing, Injection Molding, casting, laser machining, EDM, or any combination of these techniques. Retainer may have ports or openings leading to cavities such that pins may be loaded from any direction.

An aspect of the present invention is that precision components may stack to form the desired dimensions. This can have advantages in ease of assembly and more adequately retaining the components after assembly and while loading into a jaw or vise. Magnets may be useful in this purpose, as a temporary retaining force that is also easily disassembled after a key is produced.

It will be appreciated that once the retainer is populated with precision components and mounted into a key duplicating machine, the operation is a simple tracing maneuver. There is no need to monitor dials, micrometers, or readouts, and no need to perform any calculation, or estimation during tracing or cutting.

A further aspect of the present invention is that conversion of a key duplicating machine to key origination functionality can be preformed in substantially the same time as is needed to set up for duplication. Conversion is temporary, and requires substantially no extra workspace. Conversion back to duplication requires on the order of a minute to perform.

A Sample Calculation

This sample calculation assumes a lock system having 0.5 inch (12.7 mm) nominal plug diameter as described in the background section above.

For the operation with an aspect of the present invention, a precision component, or stack of such components, must add to equal the root depth of the key desired, for each cut location along the longitudinal dimension of the key. In one embodiment, lock pins are used as the precision components. If no other component is introduced (eg: a strip on the bottom of the retainer for temporary retention), then the lock pins required are simply the root depths on the key, in one aspect of the present invention. These pins are not, in general, the same as the pins used in programming the lock. For example, the table below illustrates pins used to program an example lock (lock pins) and the corresponding different pins used in the retainer (retainer pins) to cut the key according to an aspect of the present invention. (dimensions in inches). The key code is often expressed as a string of depth code integers, in this example "072145" which represents a manufacturer's notation for indexed lock pins and corresponding key cuts. The dimensions used in this example are stated in inches because the manufacturer's code specification is given in inches.

| Position (space) # | Code depth | Lock pin | Retainer pin |
|---|---|---|---|
| 1 | 0 | 0.165 | 0.335 |
| 2 | 7 | 0.270 | 0.230 |
| 3 | 2 | 0.195 | 0.305 |
| 4 | 1 | 0.180 | 0.320 |
| 5 | 4 | 0.225 | 0.275 |
| 6 | 5 | 0.240 | 0.260 |

Upon inspection, in each row representing each position, the sum of the lock pin and the retainer pin adds to 0.5 inch (12.7 mm), the plug nominal diameter. It is apparent that a longer lock programming pin (lock pin) requires the use of a shorter retainer pin for use in an aspect of the present invention. In this example, the code depth for each space position is converted into the lock pin dimension, for example by lookup in a depth and space manual. The lock pin dimension is subtracted from the plug nominal diameter, yielding the retainer pin dimension.

If, in another embodiment, a precision flat strip is used under the pins, retained by magnets to assist in retention, the dimension of that strip must be subtracted from each pin used in the retainer in order to produce the same key. If said strip is 0.050 inch thick, then the retainer pins in the last column would then read 0.285, 0.180, 0.255, 0.270, 0.225, and 0.210 inch. Retainer pins may be calculated by software, for instance, as output from a masterkeying program and pins can be automatically populated into retainers, or jigs for loading retainers, via automation equipment for rapid, infallible, simple mass-production.

In a further embodiment, the reference dimension is not the plug diameter, but may be relative to a groove or ward in the side of a key, representing a point within the plug diameter, in which case the dimensions in the preceding example are not applicable. However, the calculation of the required pins or other precision components is similar, using a reference dimension different from the plug diameter, to produce an original key.

Variable Width Cuts

An aspect of the present invention provides a retainer holding precision components or pins such that a shape or profile template results in a corresponding shape to transform a key blank into a code-cut key. Generally, the pins control depths of cuts, and a retainer controls spacing of cuts. If the shape of the retainer is altered, for instance, by forming slots wider than a tracer, a cutter of a key duplicating machine is therefore allowed to translate longitudinally relative to a key blank while at a depth of a cut, producing a wider cut in a key. Analogously, a tracer made narrower than the slots has a similar effect.

High Security and Other Keying Systems

The present invention is compatible with generating from code high security keys employing angled cuts, for example, by using a key duplicating machine that facilitates angling the cutter or a tilting-head duplicating machine. In this example, the retainer and pins establish the proper depth and space dimensions, while the key machine's cutter is rotated about the transverse axis to the necessary angle for each cut, forming a cut in the key which is also rotated about the transverse axis.

The invention is also applicable to tubular or circular type locks and keys. In such a system, lock pins are arranged in a circular or circumferential pattern, rather than in a linear arrangement. In this case, the longitudinal direction is a circumference. A retainer made to match the lock pin pattern of a tubular lock, populated with pins or precision components calculated by analogous calculation, will convert a tubular duplicating machine to a code origination machine by the same method.

BRIEF DESCRIPTION OF THE DRAWINGS

These and other features, aspects and advantages of the present invention may be appreciated from the following detailed description and appended claims together with the accompanying drawings in which:

DETAILED DESCRIPTION

Retainer and Precision Components

Figure 1:
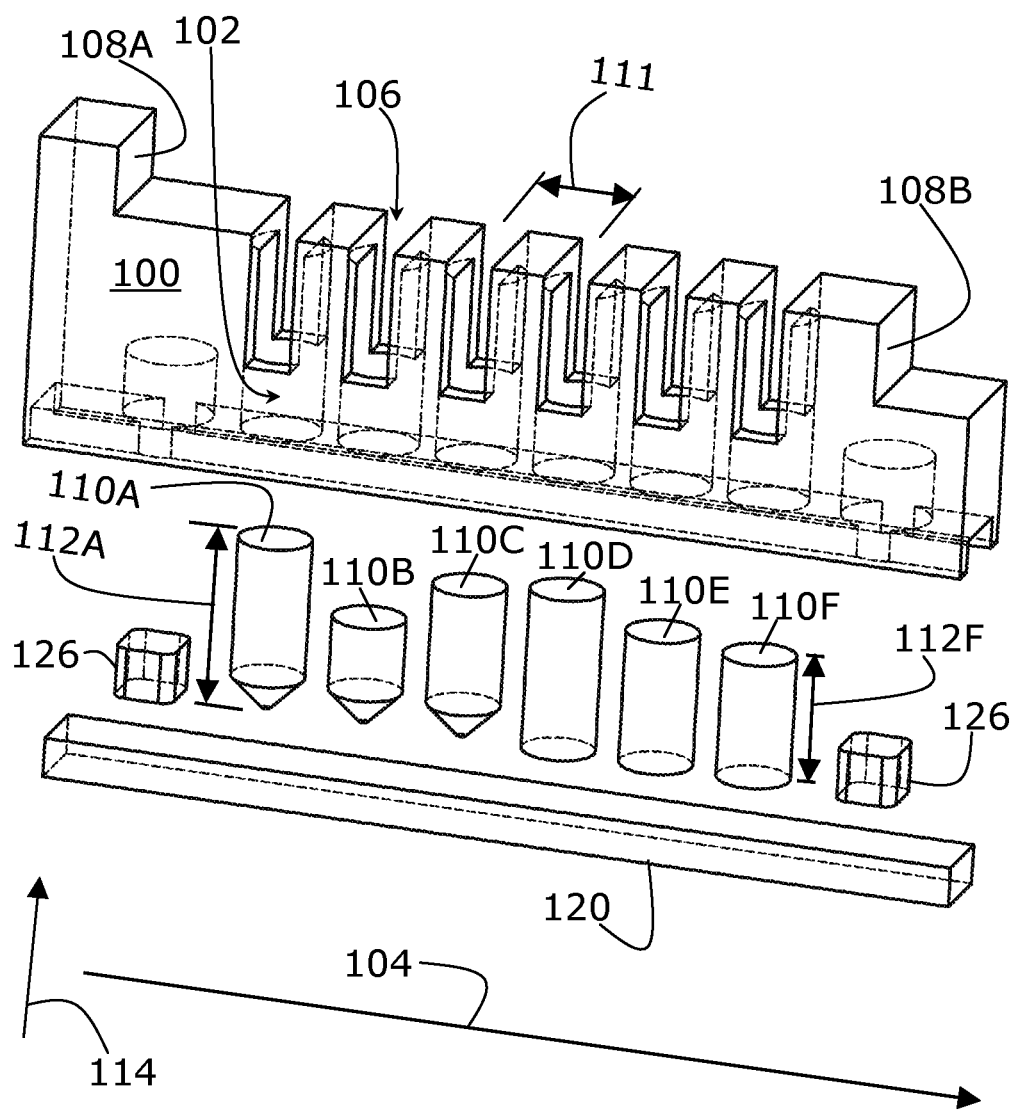
FIG. 1 is an exploded view of an embodiment of a retainer including additional precision components.

An embodiment of the present invention is shown in an exploded view in FIG. 1. A retainer 100 contains a plurality of cavities 102 distributed along a space or longitudinal direction axis 104 at a predetermined spacing 111 corresponding to a spacing dimension of pins or wafers or other components in a lock, or notches in a key. A set of slots 106 align with said cavities 102, providing access to the cavities 102 from at least one direction. Slots 106 need not have vertical sidewalls, and may be formed with angles, or shape other than straight to affect different profiles for tracing and thus different profiles or ramps in resultant key. A slight chamfer at the top of the slot could be added to allow easier insertion in tracing.

One or more reference features provide registration in the longitudinal direction 104. A shoulder reference 108A is provided for lock systems that utilize a similar feature for limiting insertion distance of a key into a lock, and to align a key with pins in a lock. A tip reference 108B is provided for lock systems that use a reference located at or near the tip of a key for registration purposes. The choice of reference feature used in creating the key is normally dictated by the lock system for which a key is intended.

Said retainer receives and holds in relative alignment a set of independent pins 110A-110F as precision components, each described by an independent length dimension in a depth or transverse direction 114. For example the pin 110A has overall length dimension 112A. Pin 110F has an overall length dimension 112F. In one embodiment, precision components are lock pins. Said lock pins are available in different shapes, as illustrated in FIG. 1. For example, pins 110A, 110B, and 110C have a tapered bottom. The governing dimension remains the corresponding overall length, as illustrated by pin 110A having overall length dimension 112A. Pins 110D, 110E, and 110F illustrate a flat bottom, cylindrical shape. Additionally, pins may have a chamfer or other feature. The governing dimension is the overall length in any case.

A retention strip 120 may optionally be included to capture or assist in retention of the precision components 110A-110F after loading into the retainer 100. Because the strip 120 illustrated modifies the position of the pins 110A-110F in the transverse direction 114, the strip 120 generally must also be of a known, precise dimension in the transverse direction 114. Such material is readily available off-the-shelf, and inexpensive in the form of precision ground flat stock, rolled or cold drawn stock, drill rod, gauge stock or other similar precision stock.

An alternate embodiment (not shown) includes holes or perforations in a strip to allow precision components, for example tapered pins 110A-110C, to communicate through said perforations in the strip, such that position of said precision components is not altered in the transverse direction 114 by the strip. In this embodiment, the strip is able to perform a retention function while not altering transverse position of said precision components and the strip in this case need not be dimensionally precise in the transverse direction 114. In order to perform the retention function, a strip need only trap the pins, and may perform this function by precisely altering the position of pins 110A-110F, or by allowing pins to communicate around strip without interference in the transverse direction.

The strip 120 assists in retaining precision components during handling, and may be temporarily secured by mechanical snaps, friction, a lip, adhesive, or by one or more magnets 126 imbedded into retainer 100. Said magnets 126 can be affixed into retainer 100 by glue, epoxy, friction, direct molding (insert molding) or other attachment method known in the art. In the case of magnetic retention, strip 120 is composed of or includes a ferromagnetic or paramagnetic material such as steel, nickel, iron, cobalt or rare-earth materials. Alternately, magnets 126 can be ferromagnetic and the strip 126 can be magnetic material such that the strip 126 and the retainer 100 experience an attractive force.

Lengths of pins 110A-110F are calculated according to the sample calculation described above, with strip 126 having a thickness of 0.050". Pin 110A has length 112A corresponding to code "0", in this example, which would have an overall length of 0.285 inch. Pin 110B corresponds to code "7" with overall length of 0.180 inch, pin 110C corresponds to code "2" with overall length of 0.255 inch, pin 110D corresponds to code "1" with an overall length of 0.270 inch, pin 110E corresponds to code "4" with an overall length of 0.225 inch, and pin 110F corresponds to code "5" having length 112F which is 0.210 inch.

Figure 2:
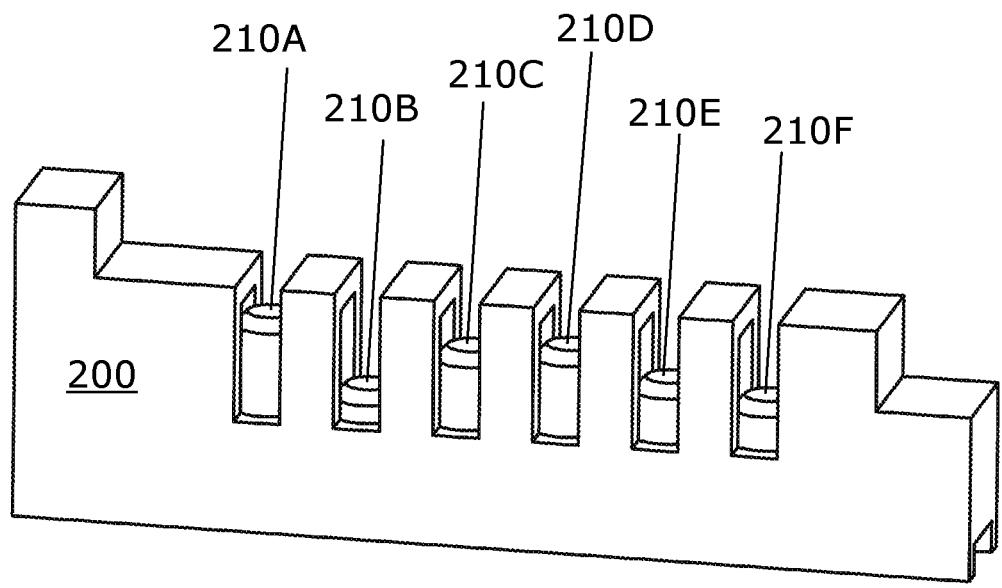
FIG. 2 is a perspective view of an embodiment of the present invention illustrating a retainer populated with precision components.

FIG. 2 illustrates an embodiment wherein precision components 210A-210F have been populated into cavities in retainer 200. The precision components 210A-210F in this embodiment are lock pins having a chamfered top surface. The chamfer does not affect the overall length, and the calculation of the overall length is the same as with pins lacking such a feature.

Lengths of pins 210A-210F are calculated according to the sample calculation described above. In this case, no retention strip is used, so pin lengths are: pin 210A is 0.335 inch for a code of "0", pin 210B is 0.230 inch for a code of "7" pin 210C is 0.305 inch for a code of "2", pin 210D is 0.320 for a code of "1", pin 210E is 0.275 inch for a code of "4" and pin 210F is 0.260 inch for a code of "5".

It will be appreciated that loading of precision components 210A-210F into retainer 200 can be performed by an operator's hand, or may be loaded by a machine, for instance a pick-and-place type machine or other automation machinery known in the art.

Alternate Loading Arrangement

Figure 3:
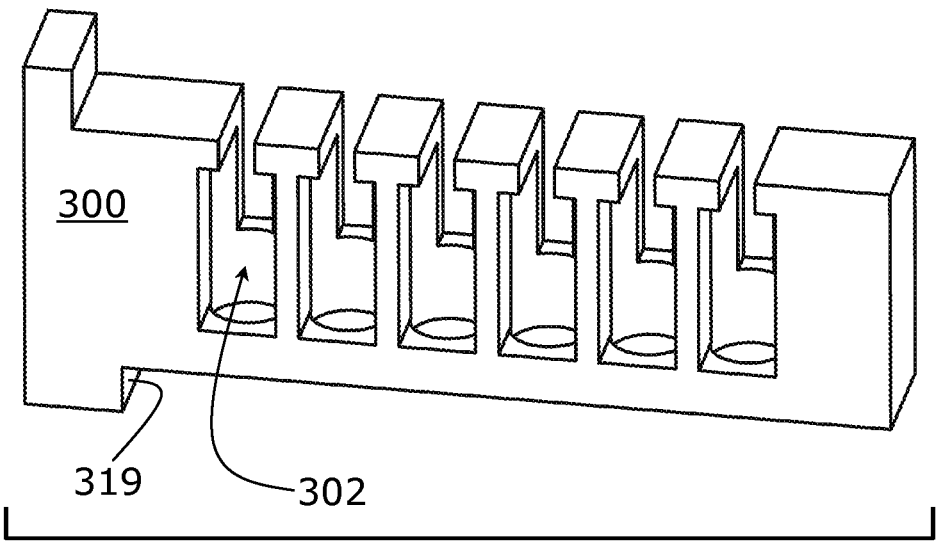
FIG. 3 is a perspective view of an alternate embodiment of an empty retainer wherein pins can be loaded from a side, and comprising a bottom shoulder reference.

FIG. 3 illustrates an embodiment of retainer 300 providing access to cavities 302 from a side of said retainer 300. A bottom shoulder reference 319, which serves as an additional longitudinal reference for registration, is an additional aspect of the present invention. For some key duplicating machines and some keying systems, a bottom shoulder reference 319 on retainer 300 is desirable for registering retainer 300 with a master vise of a key duplicating machine, which can then result in the ultimate position registration of retainer 300 with a key blank, for such key duplicating machines that rely on a similar scheme for positional registration. Bottom shoulder reference is shown presently with a side loading embodiment, but can be incorporated into any other embodiment where a key duplicating machine or key system so warrants.

Figure 4:
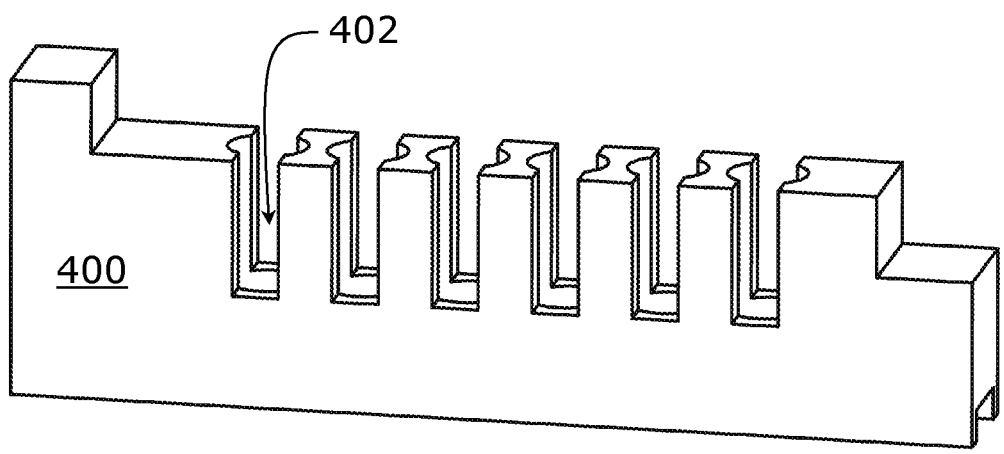
FIG. 4 is a perspective view of an alternate embodiment of an empty retainer wherein pins can be loaded from a top side.

FIG. 4 illustrates a further embodiment of the present invention wherein retainer 400 provides access to cavities 402 from a top side of retainer 400. It will be appreciated that this embodiment allows pins or precision components to be exchanged or substituted while retainer remains loaded in a vise of a key duplicating machine such that re-registration of retainer is not required, after an initial registration. An aspect of the present invention provides a stack of pins in each cavity or location, therefore pins may be replaced, added or subtracted without removing retainer 400 from the vise. This topside loading embodiment allows more rapid production of multiple original keys having distinct codes, since repeated registration is eliminated. Pins may be loaded from a jig or mating apparatus such that all cavities 402 can be loaded in a single operation. This method is adaptable to a mass production scale, by queuing many such jigs for loading while an eminent cutting operation proceeds.

Operation in Conjunction with a Key Duplicator

Figure 5:
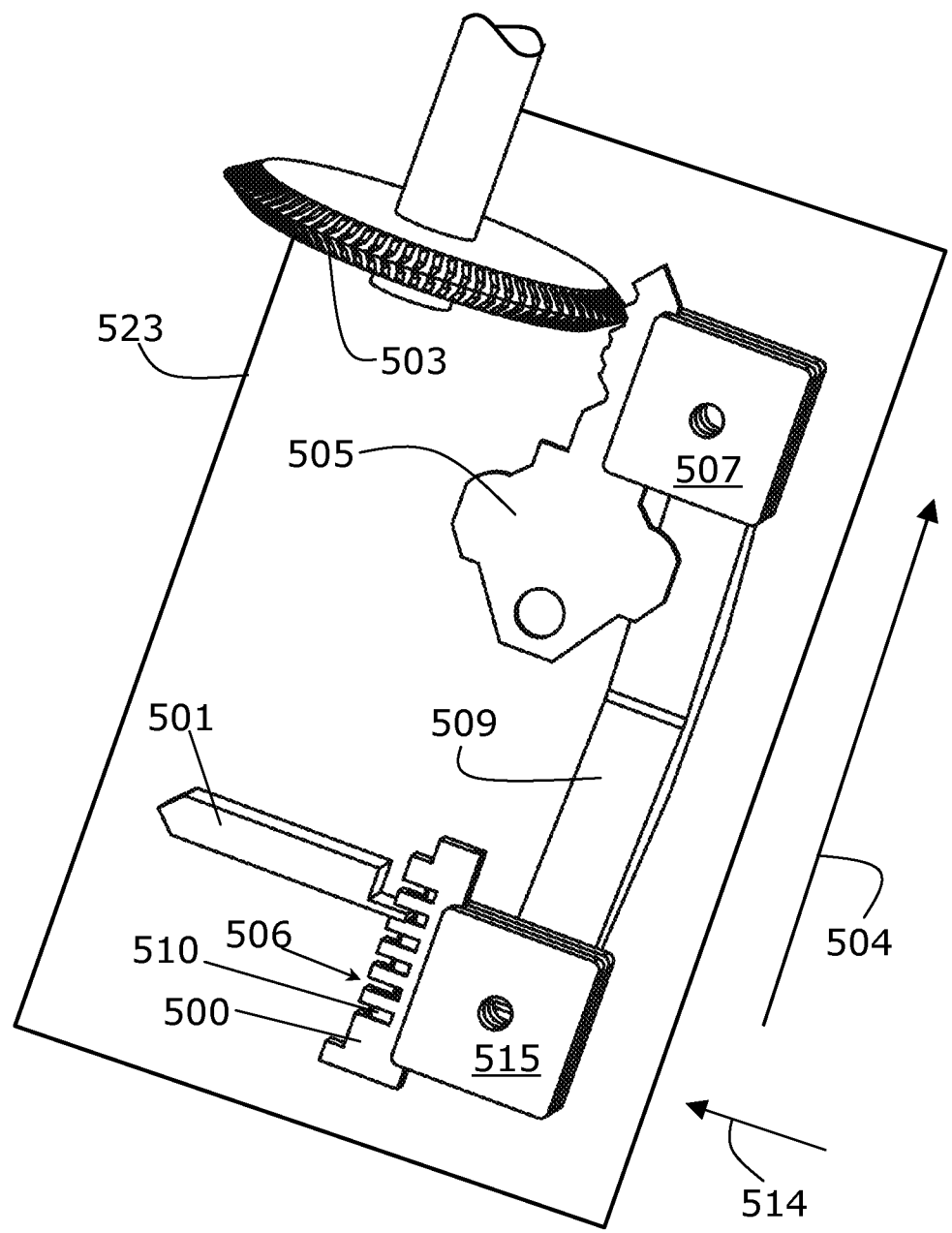
FIG. 5 is a perspective view of an embodiment of the present invention illustrating operation in vises of a key duplicating machine.

FIG. 5 illustrates an embodiment in operation in a conventional key duplicating machine 523. Under normal operation of the conventional key duplicating machine 523, a tracer 501 and a rotary cutter 503 remain fixed in position relative to a frame of the key duplicating machine 523, and therefore fixed relative to one another. Cutter 503 rotates and mills a key blank 505 in a conventional manner. Said key blank is temporarily clamped or secured in a holder, or copy vise 507. Said copy vise 507 is affixed to a movable carriage 509 that is movable in two spatial dimensions. Carriage 509 is free to move in a space or longitudinal axis 504 and a depth or transverse axis 514. A master vise 515 is affixed to carriage 509, and a retainer 500 containing one or more pins 510 is temporarily clamped, secured or installed in said master vise 515.

Therefore, carriage 509, copy vise 507, master vise 515, key blank 505 and retainer 500 containing one or more pins 510, all move in unison in two axes relative to the fixed stylus or tracer 501 and cutter 503.

In operation, tracer 501 is sequentially guided in two spatial dimensions into communication with the pins 510, and slots 506, causing cutter 503 to remove material from key blank 505 according to the details of the calculated dimensions of the pins 510 and the shape of retainer 500.

Therefore, key blank 505 is transformed into a precision-shaped key, specified by a code, to operate a predetermined programmed lock allowing said code.

It will be appreciated that cutter 503 need not be of a rotary variety, milling type or of any particular operational function. Key blank 505 can be formed by any operation known in the art of forming, such as shearing, clipping, grinding, or ablation. An aspect of the invention is that the retainer 500 and pins 510 guide the key blank 505 to a corresponding location having any type of forming tool for material removal or other shape altering operation.

It will also be appreciated that tracer 501 may be guided relative to carriage 509 by an operator's hand, or may be guided automatically.

Groove or Ward for Transverse (Depth) Registration

In some lock/key systems, the reference feature for registration in the transverse or depth direction is a longitudinal slot, step, channel, ridge or groove on a key, which mates with a corresponding feature in the warding (keyway) of a lock. This is particularly true on keys having cuts on both transverse edges of a key, either because the lock has pins or wafers on both sides, or the key is designed to be inserted in multiple orientations. Such keys are sometimes conventionally referred to as double-sided or double-bitted.

Figure 6:
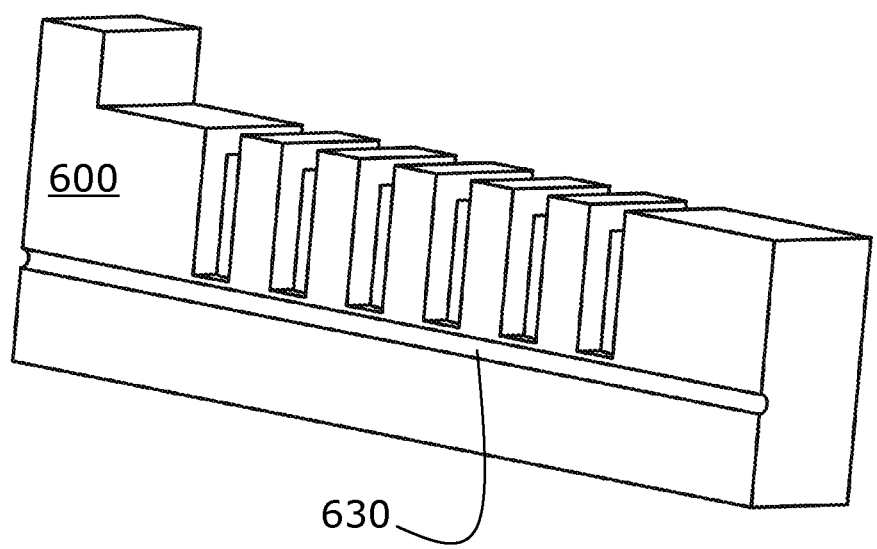
FIG. 6 is a perspective view of an alternate embodiment of the present invention illustrating a retainer having a side groove for transverse or depth axis registration.

For such lock/key systems, features are included in an embodiment as shown in FIG. 6. A retainer 600 includes at least one of a ridge, channel, step or groove 630 to provide a reference for registration of the depth or transverse position.

Figure 7A:
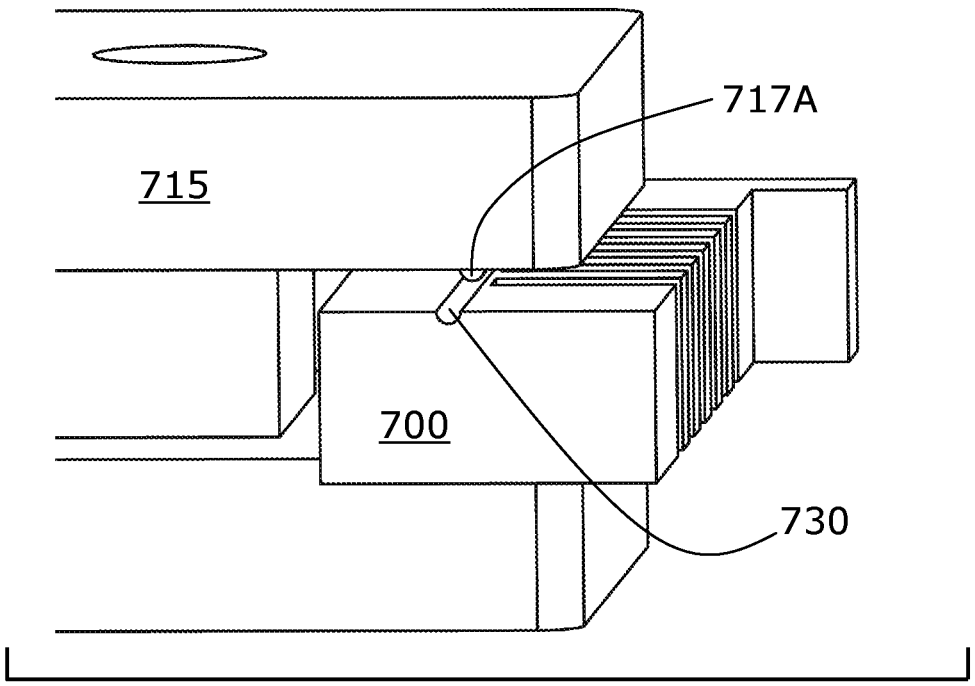
FIG. 7A is a perspective view of an embodiment of the present invention illustrating registration of a retainer in a master vise of a key duplicating machine using side grooves.

FIG. 7A illustrates a retainer 700 having a groove 730 mounted in a master jaw, holder or master vise 715 of a key duplicating machine, wherein said master vise 715 includes a mating ridge 717A for registration.

Figure 7B:
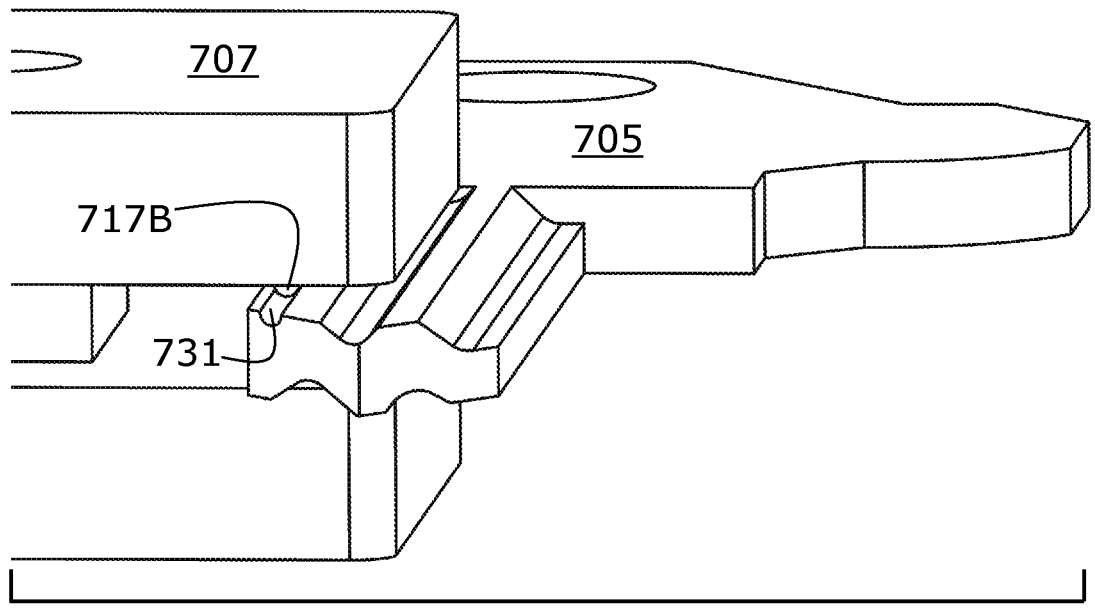
FIG. 7B is a perspective view of an embodiment of the present invention illustrating registration of a key blank in a slave vise of a key duplicating machine using side grooves.

FIG. 7B illustrates a corresponding copy vise 707 holding a key blank 705, registered to said copy vise 707 having a ridge 717B, which mates with a feature or groove 731 in key blank 705, thereby providing suitable reference such that retainer 700 and key blank 705 are simultaneously held in relative registration as they are moved in unison in the key duplicating machine.

Often a key duplicating machine has vises which can be configured for bottom reference or groove reference so that one key duplicating machine may be used to duplicate many different types of keys. This is often accomplished with a rotatable cube-shaped vise that may be configured into multiple different positions. For example, positions can be configured as upper groove, lower groove, upper and lower groove and no groove (conventional bottom reference). FIG. 6 and FIG. 7 illustrate use with one such arrangement, though the present invention can be configured with mating features to to align and register with any similar configurations, and one retainer may be designed to operate with multiple registration schemes. It will be appreciated that a retainer may include more than one type of feature for registration with different mating features in a vise, thus making the retainer more universal for use with different key duplicating machines, keying systems and warding patterns of different keys. In a specific embodiment, side(s) of a retainer could substantially share a profile of a key blank, matching all warding as illustrated in cross-section in a key blank catalog, for use with primarily one manufacturer's keying system. In another embodiment, features may resemble no specific key warding, but contain multiple features, designed to register as many different keying systems as possible.

Cut Wider Than Cutter

Keying systems have different dimensions for the spacing between pin stacks, known as the space dimension. Some systems employ an increased space between stacks so that the key may have a wider cut (a wide flat region at the depth of cut), for instance to allow more operating tolerance in the lock and key in the longitudinal (space) direction. In manufacturing a key, this wide cut is conventionally accomplished by using a cutter having a profile with wider flat region flanked by two angles. An embodiment of the present invention provides a method for variable flat region width using a single cutter, which need not have a flat region.

Figure 8A:
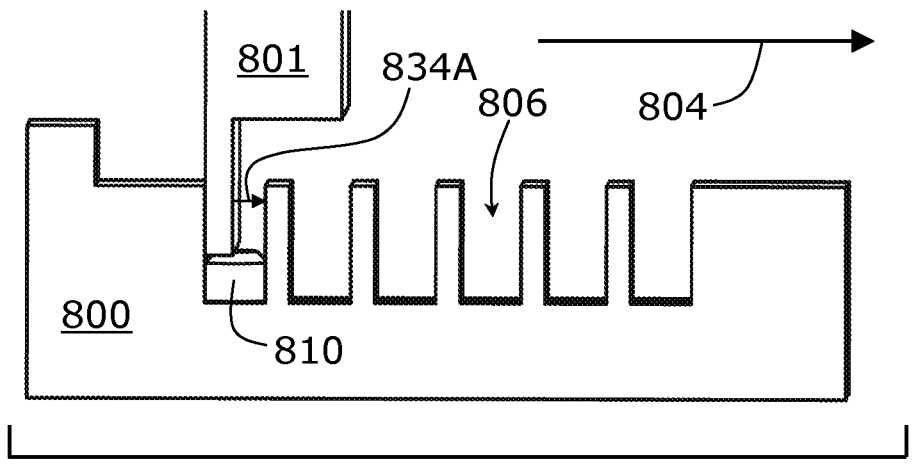
FIG. 8A is a perspective view of an embodiment of the present invention illustrating a slot in a retainer that is wider than a tracer.
Figure 8B:
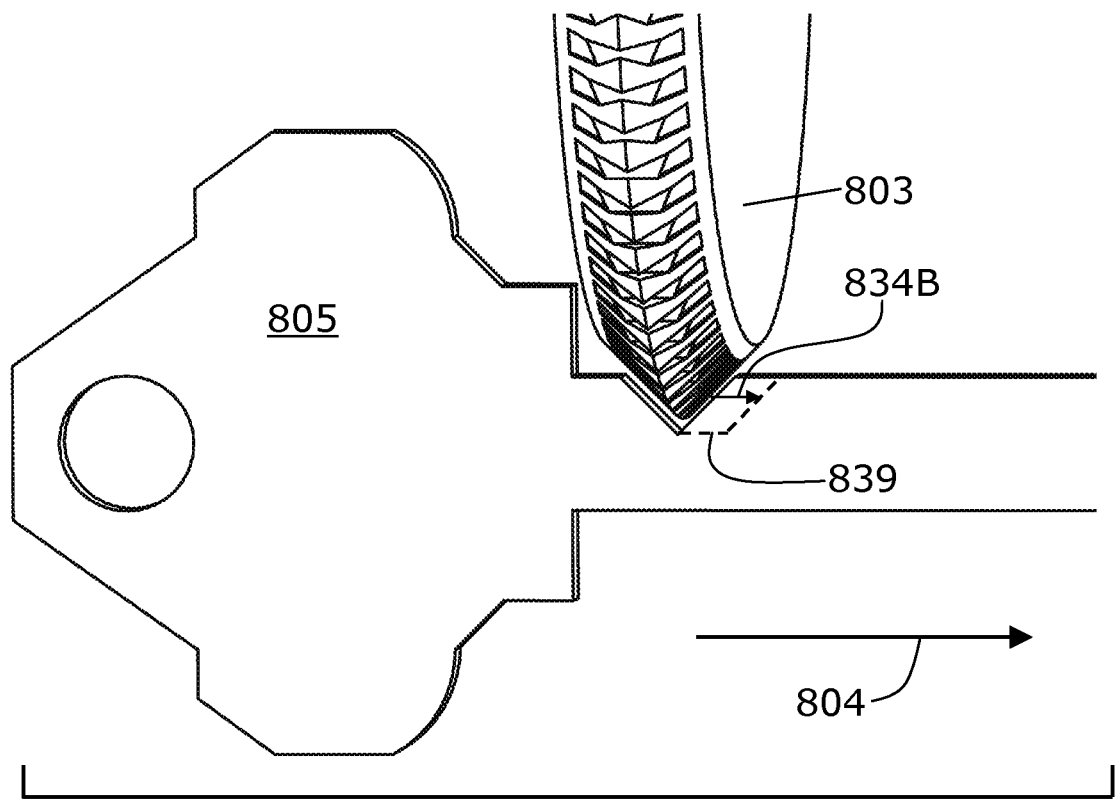
FIG. 8B is a perspective view of an embodiment of the present invention forming a cut in a key that is wider than a cutter.

FIG. 8A illustrates an embodiment having a retainer 800 wherein slots 806 are wider than a tracer 801 by a predetermined width 834A in a longitudinal direction 804. Referring also to FIG. 8B, this arrangement allows a cutter 803 to be translated in the longitudinal direction 804 by the predetermined width 834A resulting in a flat region 839 of a cut in a key blank 805. Adjustment of predetermined width 834A may be affected by changing tracer 801 or retainer 800 or both, while depth of cut is determined by length of pin 810 as previously described. Predetermined width 834A is substantially the same as a cut width adjustment 834B owing to the fact that retainer 800 and key blank 805 are guided in unison as previously described. Cutter 803 may include a flat region between angles, which will result in flat region on key that is the sum of the cutter flat plus the predetermined width 834A.

Setup Key for Registration

Figure 9:
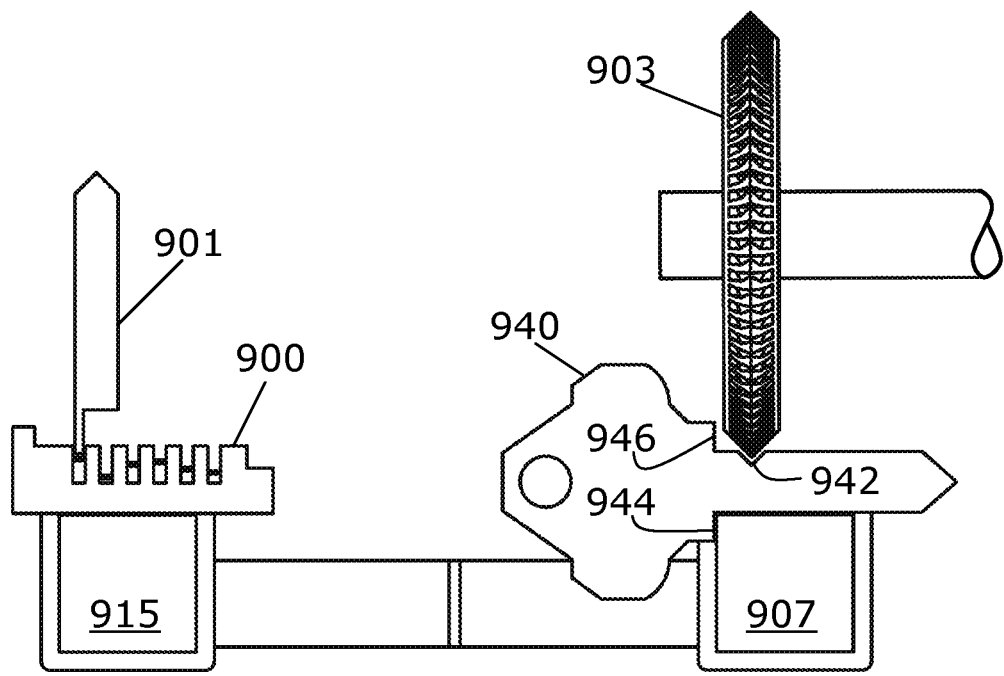
FIG. 9 is a top view of an alternate embodiment of the present invention illustrating a method of registration using a setup key.

Registration or alignment of components may be accomplished by many different methods. Another embodiment of a registration scheme is presented in FIG. 9. A setup key 940 is provided such that a notch 942 is formed in a location on setup key 940 that substantially corresponds to an intended location of a cut on a key (eg: the first space location, as specified by a lock manufacturer). Shape of said notch 942 is desirable to substantially match a shape that would be formed by a cutter 903 or is shaped in such a way that registration of setup key 940 with cutter 903 may be effected accurately.

Setup key 940 is loaded into a slave vise 907 of a key duplicating machine. Slave vise 907 is illustrated with a top portion removed for clarity. In this embodiment, setup key 940 mates with slave vise 907 against a bottom shoulder 944 of setup key 940. Setup key 940 is produced such that bottom shoulder 944 is transversely aligned with top shoulder 946. Setup key 940 is secured in the position described.

Retainer 900 is loaded into a master vise 915, with the position of retainer 900 remaining adjustable. Master vise 915 is illustrated with a top portion removed for clarity. A first slot of retainer 900 is brought into longitudinal alignment with a tracer 901, while simultaneously bringing cutter 903 into longitudinal alignment with notch 942 of setup key 940. Retainer is secured in the position described.

Setup key 940 can then be removed and a key blank is loaded into slave vise 907 using a similar bottom shoulder longitudinal reference as described above.

Transverse alignment can be achieved by several methods. In one embodiment, the master vise 915 and slave vise 907 are relatively aligned with tracer 901 and cutter 903 such that bottoms of retainer 900 and a key blank are registered by bottoming out in each respective vise. In another embodiment, as described previously, a ward or groove in both a retainer and a key blank could mate with similar features in vises for transverse alignment. A further embodiment provides the depth of the notch 942 in setup key 940 being simultaneously registered with a pin of predetermined length within retainer 900. Transverse registration is finalized by either adjusting position of retainer 900 or tracer 901. In this way, the notch 942 can simultaneously align retainer 900 and precision components or pins therein with setup key 940 in two dimensions and transitively, register retainer 900 with a key blank.

It will be appreciated that any method that aligns setup key 940 with slave vise 907 in a similar way as a key blank will produce the same desirable result in ultimately registering retainer 900 with a key blank. For example, other possible methods use key tip reference, or top shoulder reference. It will further be appreciated that the use of the first slot in the description above is not limiting. Any slot will suffice, as long as setup key 940 is designed with a properly positioned notch for the configuration.

An objective of the present invention is to adapt a wide variety of key duplicating machines commercially available to function as a code-cutting machine. An advantage of this embodiment, using a setup key 940, is to simplify the adaptation to a broader selection of such key duplicating machines and with a broader selection of keying systems. Certain registration methods work best with one class of machine or a particular type of keying system, while other methods provide better adaptation for other machines and keying systems.

Angled Cuts for High Security Keys

An aspect of the present invention provides a key duplicating machine having a cutter rotatable about a transverse axis, such that cuts having an angle adjustable about said transverse axis are made in a key blank.

Figure 10:
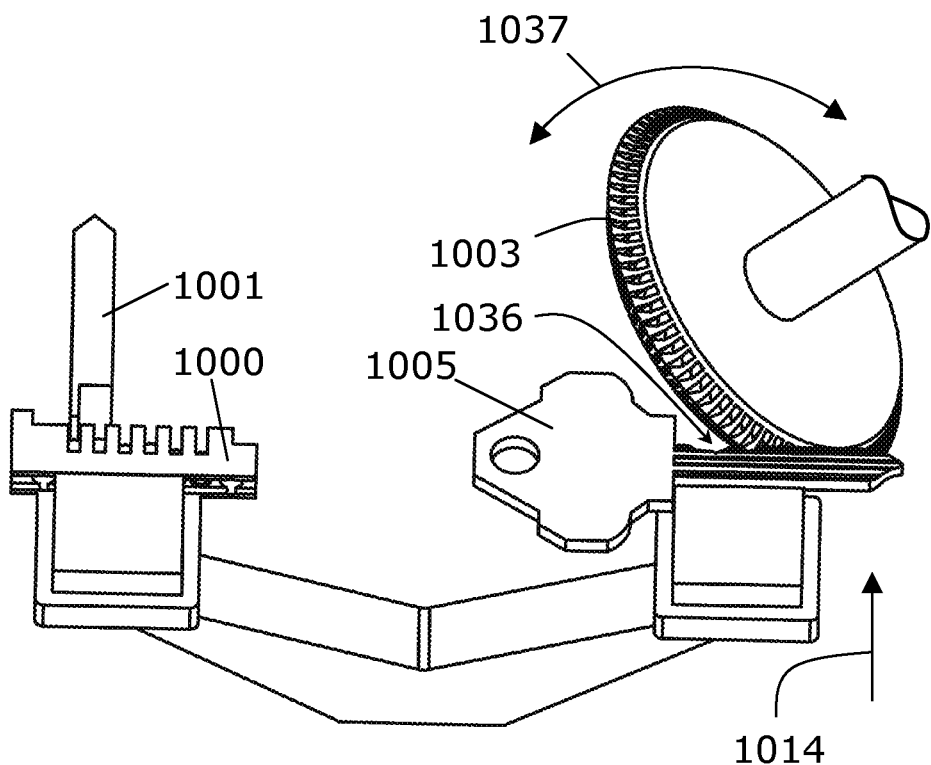
FIG. 10 is a perspective view of an alternate embodiment of the present invention illustrating a system for originating high security keys with angled cuts.

FIG. 10 illustrates a system comprising a key duplicating machine with a cutter 1003 rotatable about a transverse axis 1014. Adjustable rotation of cutter 1003 about transverse axis 1014 is indicated by arrow indicating adjustable cutter angle 1037. An angled cut 1036 in key blank 1005 results as tracer 1001 is guided in communication with retainer 1000. The longitudinal position of a cut 1036 on the key blank 1005 is substantially determined by a slot in retainer 1000, and depth of cut is substantially determined by precision components within retainer 1000 as previously described. A third dimension, the angle of the cut 1036, is substantially determined by adjustment of angle 1037 of cutter 1003.

Adjustment for Machine Parallelism or Wedge Error

Key duplicating machines require periodic adjustment and calibration to ensure that the resultant cut key is dimensionally accurate. For most machines, there are two adjustments, one for the longitudinal (space) axis and one for the transverse (depth) axis. The longitudinal axis adjustment ensures that when a master key and a blank key are loaded, their longitudinal separation is substantially the same as the tracer/cutter separation. The transverse (depth) axis adjustment ensures that the tracer is at the same relative depth into the master key as the cutter's depth into the key blank.

However, two axes of adjustment may be insufficient to correct all inaccuracies in the key machine. For example, if the longitudinal alignment of one jaw or vise is not parallel to the longitudinal alignment of the other vise, then an error will be present in the cut key that is not correctable by the simple two-axis adjustment described above. In this case, if the machine's depth axis is correctly adjusted on the first space of the key, then, due to lack of parallelism, the depths will not match on the other spaces. This type of error is often linear—that is, the depth error will increase linearly from the first space to the last. A conventional error minimization procedure adjusts the machine to allow matching depths in the center space while the first space and last space would have reduced errors, in opposite directions.

Figure 11:
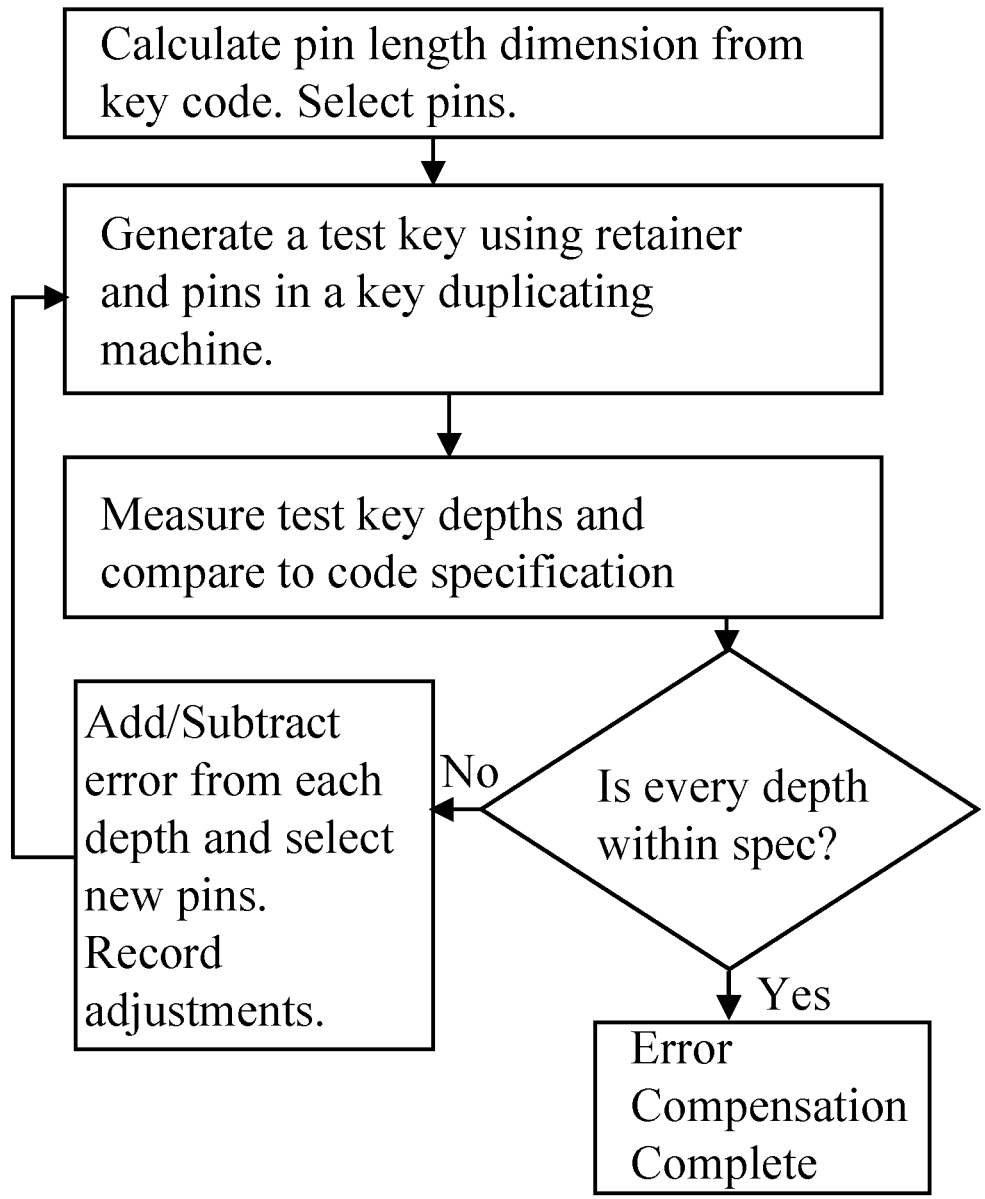
FIG. 11 is a flowchart illustrating machine error compensation by adjustment to a pin calculation as an aspect of the present invention.

An aspect of the present invention allows for correction of this type of error, or any repeatable error when originating a key, by deliberate selection of pins or precision components, adjusted from the calculated lengths, to separately compensate for the error at each space location. For example, a typical adjustment procedure is illustrated in FIG. 11. A key code is selected, and retainer pin lengths are calculated from the selected code. A test key is cut using an aspect of the present invention. The test key is measured and compared to the specification for the selected code. If any of the depths on the key are in error beyond a chosen tolerance, the pin lengths are adjusted individually for each depth found to be in error, the adjustment is noted and pins substituted to compensate for the error found. Another test key is then produced and measured again, repeating until no error exists. The noted adjustments or offsets can then be used, separately for each individual space position, to produce keys of any desired code, resulting in errors less than the chosen tolerance. It will be appreciated that the error minimization technique described can be practiced in conjunction with another aspect of the present invention in which the retainer remains affixed in a vise while adjusted pins are substituted, obviating repeated registration of a retainer after an initial or first registration.

I claim:

1. An assembly for adapting a key duplicating machine to transform a key blank into an original key specified by a code, comprising:
    a retainer;
    a plurality of cavities in said retainer, disposed in a longitudinal direction;
    a plurality of slots in said retainer, substantially aligned with said cavities, said slots oriented perpendicular to both said longitudinal direction and to a transverse direction;
    a plurality of pins having a length calculated from said code, installed in said cavities, said slots extended above said pins in said transverse direction;
    whereby said retainer and said pins form a template for said key duplicating machine to trace, and thereby transform said key blank into said original key corresponding to said code.

2. An assembly according to claim 1 wherein said retainer further comprises one or more reference surfaces for longitudinal registration of said retainer relative to said key blank.

3. An assembly according to claim 1 further comprising an elongated strip, spanning said retainer, whereby said pins are substantially captured while said retainer is manipulated.

4. An assembly according to claim 3 further comprising one or more magnets imbedded in said retainer whereby said elongated strip is temporarily secured in place by an attractive force due to said magnets.

5. An assembly according to claim 1 wherein said slots are a calculated dimension wider in said longitudinal direction than a tracer of said key duplicating machine, whereby said tracer and a cutter are able to translate in said longitudinal direction while said tracer is in communication with one said pin, such that a corresponding flat region of a cut results in said key blank, said flat region of said cut is larger in said longitudinal dimension by an amount substantially equal to said calculated dimension.

6. An assembly according to claim 1 wherein said retainer further comprises at least one selected from the group of a ridge, groove, channel and step in said longitudinal direction whereby said retainer is registered in a transverse direction with a mating feature in a master vise of said key duplicating machine.

7. An assembly according to claim 1 wherein said cavities in said retainer extend to a top surface whereby said pins are exchangeable while said retainer remains affixed in a vise of said key duplicating machine.

8. A system to transform a key blank into an original key specified by a code, comprising:
- a key duplicating machine having a tracer and a cutter;
- a retainer having a plurality of cavities disposed in a longitudinal direction at a predetermined spacing, installed in a master vise of said key duplicating machine;
- a plurality of slots in said retainer, substantially aligned with said cavities, said slots restraining motion of said tracer and said cutter in said longitudinal direction;
- a plurality of pins having a length calculated from said code, installed in said cavities;
- whereby said retainer and said pins form a tracing template for said key duplicating machine to transform said key blank into said original key corresponding to said code.

9. A system according to claim 8 wherein said key duplicating machine further comprises a cutter rotatable about a transverse axis, whereby cuts having an angle adjustable about said transverse axis result in said key blank.

* * * * *